United States Patent [19]

Kinoshita

[11] Patent Number: 5,029,071
[45] Date of Patent: Jul. 2, 1991

[54] MULTIPLE DATA PROCESSING SYSTEM WITH A DIAGNOSTIC FUNCTION

[75] Inventor: Tsuneo Kinoshita, Tokyo, Japan

[73] Assignee: Tokyo Shibaura Denki Kabushiki Kaisha, Kawasaki, Japan

[21] Appl. No.: 129,909

[22] Filed: Dec. 7, 1987

Related U.S. Application Data

[63] Continuation of Ser. No. 503,253, Jun. 10, 1983, abandoned.

[30] Foreign Application Priority Data

Jun. 17, 1982 [JP]  Japan ................. 57-104577

[51] Int. Cl.⁵ ............ G06F 15/16; G06F 11/26; G06F 11/34
[52] U.S. Cl. ............ 364/200; 364/228.3; 364/229.2; 364/259.2; 364/268.3; 364/268.8; 364/269.2; 364/267; 364/267.4; 364/267.6; 364/267.7; 364/268.2; 364/269.0; 371/9.1; 371/11.3; 371/24; 371/68.3
[58] Field of Search ... 364/900 MS File, 200 MS File; 371/68.3, 68.1, 36, 3, 4, 9, 11-13, 16-17, 19-20, 24, 9.1

[56] References Cited

U.S. PATENT DOCUMENTS

| | | | |
|---|---|---|---|
| 3,517,174 | 6/1970 | Ossfeldt | 364/200 |
| 3,864,670 | 2/1975 | Inoue | 364/200 |
| 3,898,621 | 8/1975 | Zelinski | 364/200 |
| 4,012,717 | 3/1977 | Censier et al. | 371/68.3 |
| 4,044,337 | 8/1977 | Hicks et al. | 364/200 |
| 4,096,990 | 6/1978 | Strelow | 371/68.3 |
| 4,484,275 | 11/1984 | Katzman | 364/200 |
| 4,616,312 | 10/1986 | Uebel | 364/200 |
| 4,633,472 | 12/1986 | Krol | 364/200 |
| 4,679,151 | 7/1987 | Morris et al. | 371/68.1 |

FOREIGN PATENT DOCUMENTS

| | | |
|---|---|---|
| 54-19628 | 2/1979 | Japan . |
| 1166057 | 10/1969 | United Kingdom . |
| 1373014 | 11/1974 | United Kingdom . |
| 1414095 | 11/1975 | United Kingdom . |
| 2016176A | 9/1979 | United Kingdom . |

Primary Examiner—David Y. Eng
Assistant Examiner—Emily Y. Chan
Attorney, Agent, or Firm—Cushman, Darby & Cushman

[57] ABSTRACT

A multiple data processing system includes first and second microprocessors for executing the same data processing in parallel fashion. A selector selectively delivers one of the output data of the microprocessors to an external I/O device. A comparator detects an off normal data processing state by comparing the output data of the first microprocessor with the output data of the second microprocessor. An operation monitor evaluates the operation state of the microprocessors in response to a signal from the comparator and instructs the selector to deliver output data sent from a normal channel to the external I/O device.

7 Claims, 3 Drawing Sheets

MULTIPLE DATA PROCESSING SYSTEM WITH A DIAGNOSTIC FUNCTION

This is a continuation of application Ser. No. 503,253, filed June 10, 1983, which was abandoned upon the filing hereof.

BACKGROUND OF THE INVENTION

This invention relates to a data processing system, and in particular, to a multiple data processing system for redundantly executing data processing.

Most of the newest airplanes are computer-controlled to some extent, and, in particular, computers are widely used for the fuel control of jet engines. There is a possibility, however, that a jet engine may not be properly controlled due to a malfunction of the computer for some reason. In order to avoid the problems resulting from such erroneous operation of the computer, a method may be employed which selects a solution on a majority basis from the results of calculations made by several computers. This method, however, requires a number of microprocessors and thus a large, complicated control system, resulting in high cost and high power dissipation.

SUMMARY OF THE INVENTION

It is accordingly the object of this invention to provide a multiple data processing system which can be compact and permits a low power dissipation and still provides a highly-reliable data processing feature.

According to this invention there is provided a multiple data processing system comprising first and second processors for executing the same data processing; a comparator for comparing respective data from the first and second processors and for producing a noncoincidence signal when a noncoincidence occurs between the respective output data of the first and second processors; an operation monitor for instructing the first and second processors in response to the noncoincidence signal to execute a test processing and for comparing the output data of the first and second processors produced as a result of the test processing with predetermined reference data and producing an output signal corresponding to the comparison result; and a selector for selectively delivering one of the output data of the first and second processors on the basis of the output signal of the operation monitor. A single input/output bus is employed to connect each processor with the comparator, operation monitor and selector, greatly reducing necessary system hardware.

DETAILED DESCRIPTION OF THE PREFERRED EMBODIMENTS

Figure 1:
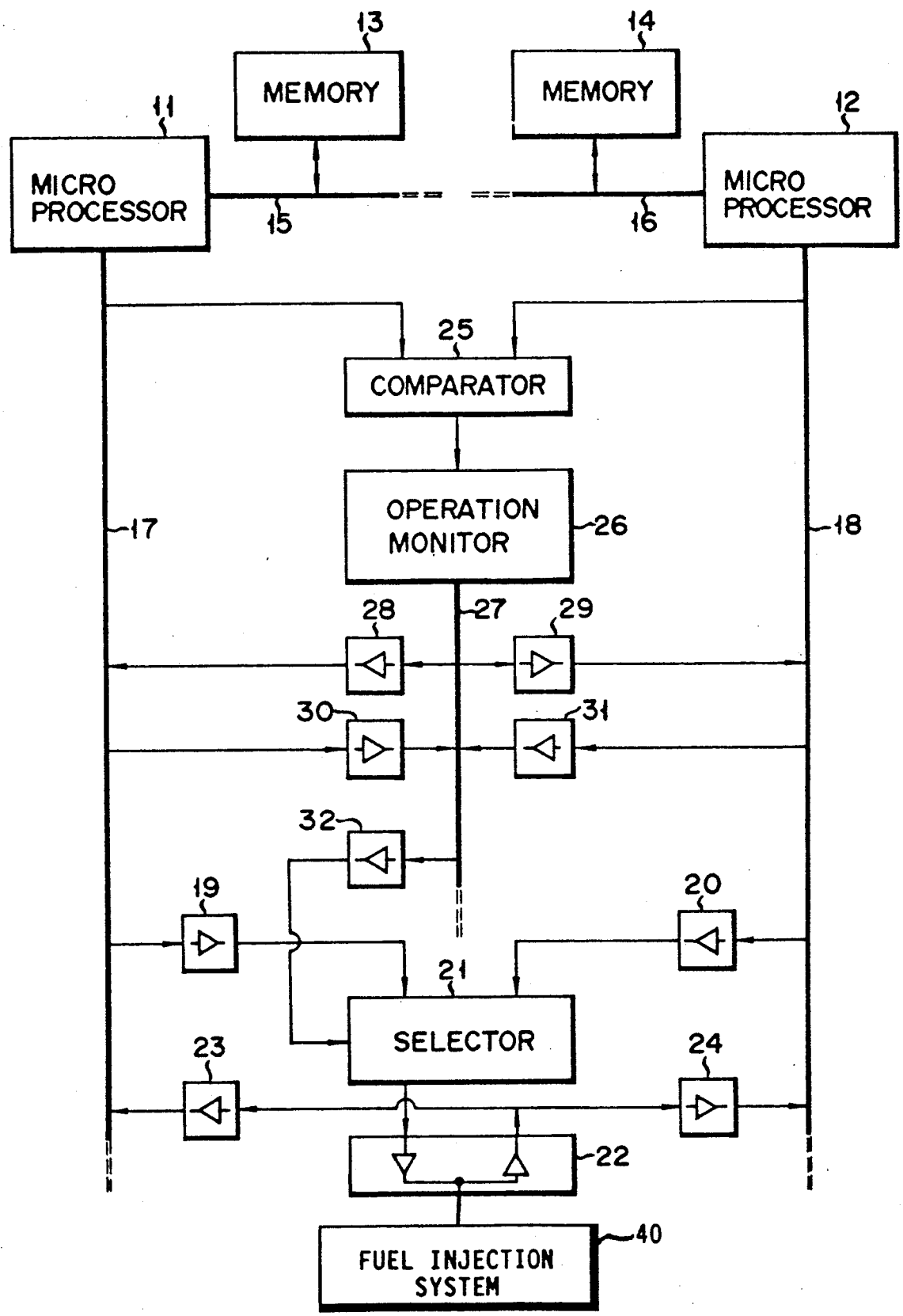
FIG. 1 is a block diagram showing a multiple data processing system according to one embodiment of this invention.

FIG. 1 shows a multiple data processing system according to one embodiment of this invention. The data processing system includes redundant, independently functioning data processing channels A, B. Channel A includes a microprocessor 11 and main memory 13 and channel B includes a microprocessor 12 and main memory 14 which are of the same type as the microprocessor 11 and memory 13. An I8085 (Intel Corp.), for example, may be used for the microprocessors 11 and 12. The microprocessors 11 and 12 are connected respectively through memory buses 15 and 16 to the main memories 13 and 14. The main memories 13, 14 store programs of the same contents including a jet engine control routine and test routine. The test routine permits, for example, all the instructions acceptable to the microprocessors 11, 12 to be organized in an increasing order of dependency. The microprocessors 11 and 12 are connected respectively through input/output (I/O) buses 17 and 18 and drivers 19 and 20 to the corresponding input terminals of a channel switching selector 21. The output terminals of the selector 21 are connected to I/O devices (not shown), such as air pressure sensors, thermosensors (not shown) or a fuel injector system 40, external to the system, and to a driving input terminal of a bus-transceiver 22. The receiving output terminal of the bus-transceiver 22 is connected respectively through receivers 23 and 24 to the I/O buses 17 and 18.

The system includes a comparator 25 whose input terminals are connected respectively through the I/O buses 17 and 18 to the microprocessors 11 and 12 to compare output data from the microprocessor 11 with output data from the microprocessor 12. The comparator 25 is connected at its output terminal to an operation monitor 26 and is comprised of, for example, exclusive-OR gates to output a noncoincidence signal when, during the data processing, the data in channel A differs from the data in channel B. The operation monitor 26 is comprised of a microprocessor having, for example, a ROM and RAM and adapted to evaluate the operation state of the microprocessors 11, 12 to deliver a control signal to the selector 21. An I/O bus 27 is connected to the operation monitor 26, and, through drivers 28 and 29, respectively, to the I/O buses 17 and 18, and, through receivers 30 and 31, respectively, to the I/O buses 17 and 18. The operation monitor 26 is connected through the I/O bus 27 and driver 32 to a control input terminal of the selector 21.

Figure 2:
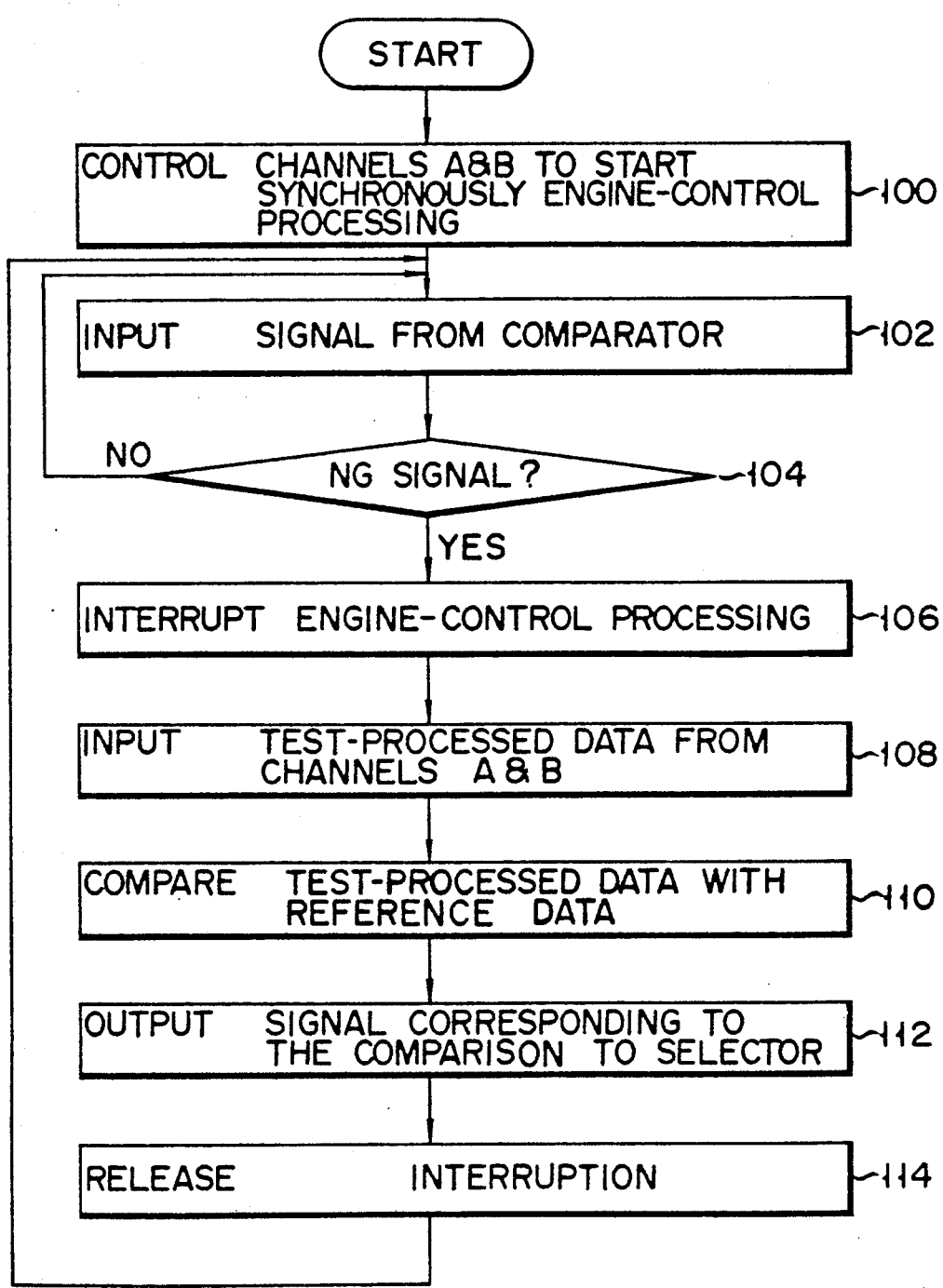
FIG. 2 is a flow chart of a program for an operation monitor of FIG. 1.
Figure 3A:
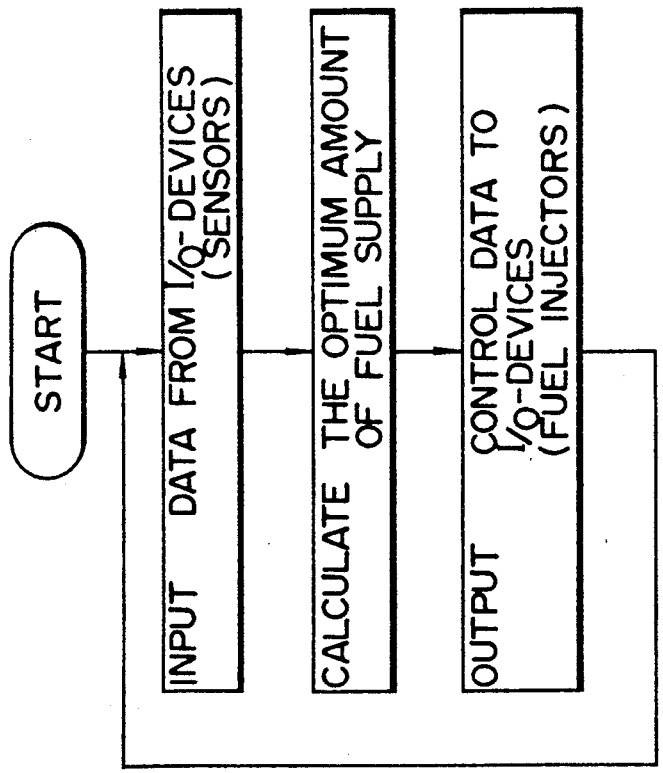
FIGS. 3A and 3B are flow charts of a jet engine control routine and test routine of programs for microprocessors of FIG. 1.
Figure 3B:
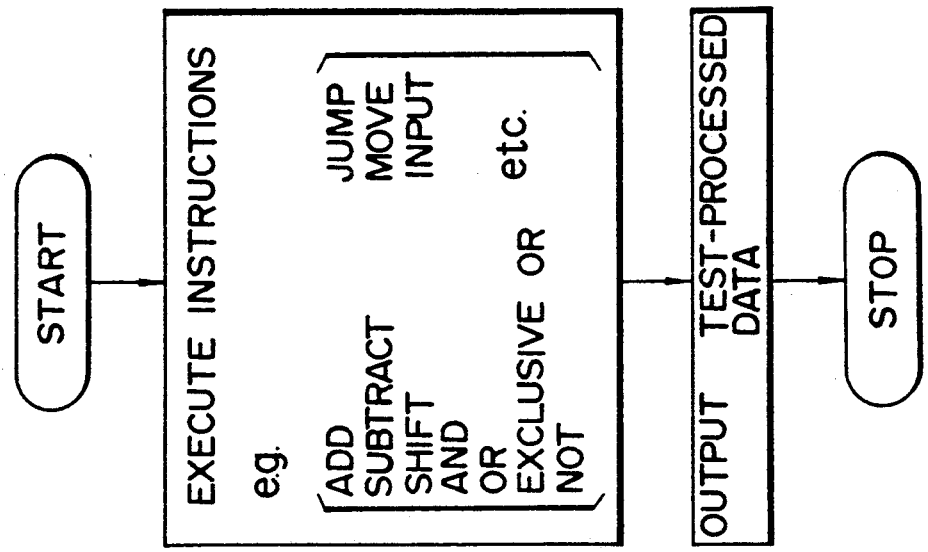

The operation of the system of FIG. 1 will be explained below by referring to FIGS. 2, 3A and 3B.

When a system start switch, for example, an engine start switch (not shown) in the cockpit of an airplane is turned ON, the operation monitor 26 is started and the selector 21 sets channel A to the system output channel. The operation monitor 26 starts both the microprocessors 11, 12 at a step 100 in FIG. 2. The microprocessors 11 and 12 process input data supplied from the I/O device, particularly sensors, through the bus-transceiver 22 and receivers 23, 24 according to the respective jet engine control routines as shown in FIG. 3A. The output data in a parallel mode from the microprocessors 11 and 12 are supplied, one through the I/O bus 17 and driver 19 and one through the I/O bus 18 and driver 20, to the selector 21. The selector 21 selectively delivers output data of channel A, i.e., output data from the microprocessor 11, through the bus-transceiver 22 to the I/O device, particularly a fuel injector.

During the jet engine control processing, the respective output data of the microprocessors 11 and 12 are periodically picked up, by the comparator 25, from the corresponding I/O buses 17 and 18 at timings corresponding to the machine cycles of the microprocessors 11 and 12. The comparator 25 compares both the output data and supplies a noncoincidence signal (NG signal) to the operation monitor 26 when an off-normal state is detected based on a noncoincidence between the data compared. The operation monitor 26, which waits for the NG signal from the comparator 25 at steps 102 and 104 in FIG. 2, starts to evaluate the operation state of the microprocessors 11 and 12 in response to the NG signal. That is, the operation monitor 26 supplies an interrupt signal through the I/O bus 27, driver 28 and I/O bus 17 and through the I/O bus 27, driver 29 and I/O bus 18 to the corresponding microprocessors 11 and 12 at step 106 in FIG. 2. At this time, the microprocessor 11 of the system output channel receives the interrupt signal earlier than does the microprocessor 12. The microprocessors 11 and 12 temporarily interrupt their execution of the engine control routines in response to the interrupt signal and start to execute test routines instead, as shown in FIG. 3B. During the test processing of the microprocessors 11, 12 the operation monitor 26 alternately receives the corresponding output data at step 108 in FIG. 2 through the I/O bus 17, receiver 30 and I/O bus 27, and through the I/O bus 18, receiver 31 and I/O bus 27. The operation monitor 26 stores, in its internal memory ROM, reference data for absolute evaluation which must be output from the microprocessors 11, 12 when the data processing is normally executed according to the test routine. Alternatively, the reference data may be supplied from the I/O device to the internal memory RAM in the monitor 26 through the bus-transceiver 22, receiver 23, receiver 30 and I/O bus 27 and through the bus-transceiver 22, receiver 24, receiver 31 and I/O bus 27. The operation monitor 26 compares the respective output data from the microprocessors 11, 12 with the reference data at step 110 in FIG. 2 and supplies a signal corresponding to the comparison result, through the driver 32, to the selector 21 at step 112 in FIG. 2. The selector 21 selects the corresponding channel on the basis of the signal from the operation monitor 26 so that control data from the normal channel can be output to the I/O device, in particular, to the fuel injector. If channel A now in use is in the off-normal state and channel B is in the normal state, the selector 21 makes the output data of channel B effective with respect to the I/O device. If, on the other hand, channel A is in the normal state and channel B is in the off-normal state, no channel switching is effected. The evaluation of the operation state by the operation monitor 26 is completed at step 114, permitting the microprocessors 11, 12 to restart engine control processing.

Where any off-normal state occurs in either channel A or B, the operation monitor causes the microprocessors 11, 12 to execute the test data processing and absolutely judges whether or not the result of processing is correct. Since, in this way, the defective channel is reliably detected, the multiple data processing system of this invention can constantly supply correct engine control data to the external I/O device.

According to the processing system of this invention, the jet engine operates properly according to an adjusted amount of fuel supplied at intervals of, for example, about 30 seconds, and the test processing is completed for a very short period of time on the order of ms or μs. If, therefore, the starting period of the test processing is initially determined such that it is set at a proper interval after an off-normal processing state in the channel is detected, unnecessary channel switching can be avoided in a case where temporary off-normal data processing occurs due to a thunderbolt, for example. Thus, in this processing system a very low percentage of system down time, i.e., a long MTBF is provided.

Since the operation monitor 26 evaluates the operation states of the microprocessors 11, 12 independently, a problem may occur in connection with the failure of the monitor 26, but according to this invention, the operation monitor 26 prevents a system output only when off-normal data processing occurs in the channel. Thus, the failure of the operation monitor creates no appreciable inconvenience for the multiple data processing system. In comparison with the conventional system, the system of this invention provides not only a reducing of hardware (component parts), including the microprocessors and attendant peripheral devices, but also improves power dissipation and lower heat emission. In short, this invention provides a compact, lightweight and more reliable multiple data processing system.

Although in this embodiment channel A is preset as a system output channel at the engine start time, channel B may be preset in place of the channel A, since channels A and B are of the same configuration.

In this embodiment, the output signal from the operation monitor shows the presence or absence of the off-normal state of the channels A, B and the selector effects a channel switching when detecting that the off-normal channel indicated by this output signal is a system output channel. The operation monitor may send a control signal to the selector when judging that the system output channel is in the off-normal state and, in this case, the selector may effect a channel switching merely in response to the control signal.

Although, in this embodiment, microprocessors are used, another type of processor can be used instead if only reliability is desired. For a small-capacity program, the microprocessor may be made more compact if a memory is incorporated within it.

The main routine of the multiple data processing system is not restricted to a routine for jet engine processing and may be modified in a variety of ways so as to serve other objectives.

What is claimed is:

1. A data processing system for controlling an input/output device, comprising:

first and second processing means for simultaneously generating control data in accordance with conditions concerning control of said input/output device;

first and second input/output buses respectively connected to said first and second processing means, for transferring data input to, and output from, said first and second processing means;

detecting means connected to said first and second input/output buses, for periodically comparing items of data transferred through said first and second input/output buses to detect a noncoincidence therebetween;

input/output means connected to said first and second input/output buses and said input/output device, for supplying actual data indicative of said conditions to both said first and second input/output buses, and supplying control data generated from a preselected one of said first and second processing means to the input/output device; and operating means connected to said detecting means and said first and second input/output buses for performing, in response to the detecting of noncoincidence by said detecting means, a diagnostic processing on said first and second processing means during which the output data of each processing means is compared with reference data, which is data from the group consisting of data stored internally or data supplied from outside, and selecting the other of said first and second processing means to be a new selected processing means in place of said preselected processing means, to supply the control data from said new selected processing means to be supplied to the input/output device in place of the control data generated from the preselected processing means when it is detected from the comparison result that the preselected processing means is not functioning correctly and the other processing means is functioning correctly, said operating means comprising:

diagnosis means connected to said detecting means, and including means for instructing said first and second processing means to perform a test processing in response to said detection of noncoincidence, means for comparing each output data of said first and second processing means with reference data identical to the output data produced as a result of said test processing performed when each processing means is in a normal state, and means for generating an output signal corresponding to the comparison result, and selecting means connected to said first and second input/output buses and said diagnosis means, for selecting one of said first and second processing means as said preselected processing means, the selection of said one processing means being switched to the other processing means when it is detected from the output signal of said diagnosis means that the preselected processing means is not functioning correctly and the other processing means is functioning correctly.

2. A data processing system according to claim 1, wherein said diagnosis means comprises means for initially instructing the selected processing means to perform said test processing.

3. A data processing system according to claim 2, wherein said first and second processing means each comprise a main memory for storing a program containing a routine for said test processing.

4. A data processing system according to claim 3, wherein said input/output device is a fuel injection system comprising a fuel injector for an engine and a sensor for sensing conditions concerning control of said fuel injector.

5. A data processing system for controlling an input/output device, comprising:

first and second processing means for simultaneously generating control data in accordance with conditions concerning control of said input/output device;

first and second input/output buses respectively connected to said first and second processing means, for transferring data input to, and output from, said first and second processing means;

detecting means connected to said first and second input/output buses, for periodically comparing items of data transferred through said first and second input/output buses to detect a noncoincidence therebetween;

input/output means connected to said first and second input/output buses and said input/output device, for supplying actual data indicative of said conditions to both said first and second input/output buses, and supplying control data generated from a preselected one of said first and second processing means to the input/output device; and operating means connected to said detecting means and said first and second input/output buses for performing, in response to the detection of noncoincidence by said detecting means, a diagnostic processing on said first and second processing means during which the output data of each processing means is compared with reference data, which is data from the group consisting of data stored internally or data supplied from outside, and selecting the other of said first and second processing means to be a new selected processing means in place of said preselected processing means, to supply the control data from said new selected processing means to be supplied to the input/output device in place of the control data generated from the preselected processing means when it is detected from the comparison result that the preselected processing means is not functioning correctly and the other processing means is functioning correctly, said operating means comprising:

selecting means connected to said first and second input/output buses, for selecting one of said first and second processing means as said preselected processing means, the selection of said one processing means being switched to the new selected processing means in response to a switching signal, and diagnosing means connected to said detecting means and said selecting means, including means for instructing said first and second processing means to perform a test processing in response to said detection of noncoincidence, means for comparing each output data of said first and second processing means with reference data identical to the output data produced as a result of said test processing performed when each processing means is in a normal state, and means for generating said switching signal when it is detected from the comparison result that the preselected processing means is not functioning correctly and the other processing means is functioning correctly.

6. A data processing system according to claim 5, wherein said first and second processing means each comprise a main memory for storing a program containing a routine for said test processing.

7. A data processing system according to claim 6, wherein said input/output device is a fuel injection system comprising a fuel injector for an engine and a sensor for sensing conditions concerning control of said fuel injector.

* * * * *